Aug. 9, 1927.
G. M. EDGARTON
1,638,092
SHOCK ABSORBER
Original Filed Oct. 13, 1924
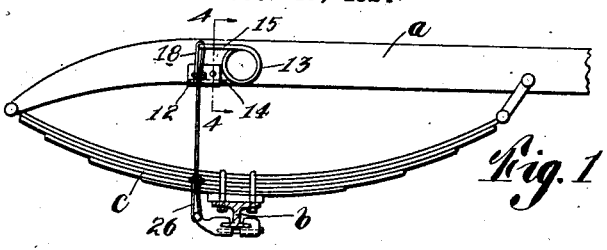
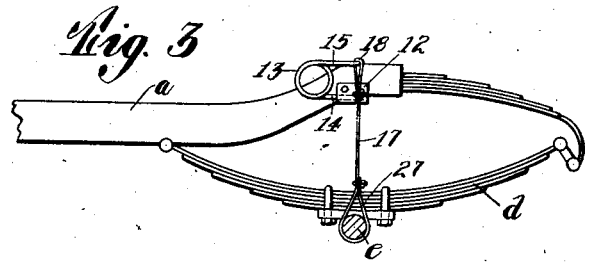
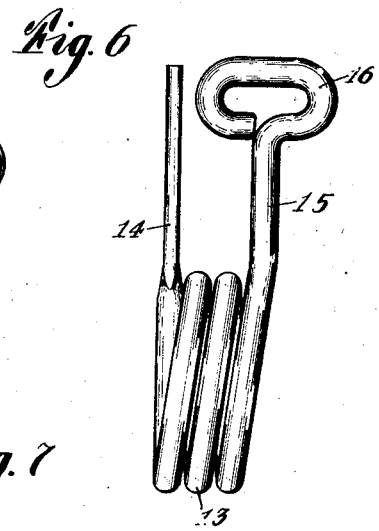
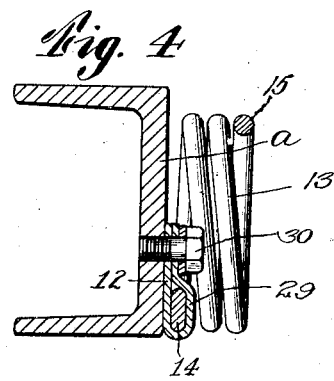
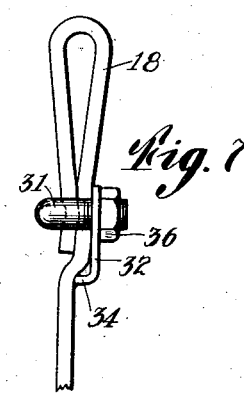
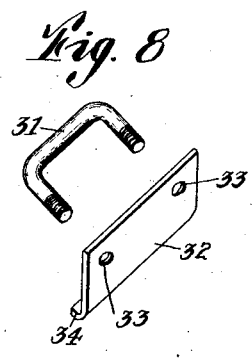
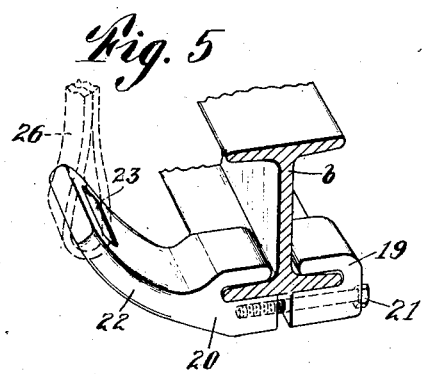
Inventor
George M. Edgarton
by Wright Brown Quinby Mey
Att'ys.

Patented Aug. 9, 1927.

1,638,092

UNITED STATES PATENT OFFICE.

GEORGE M. EDGARTON, OF BOSTON, MASSACHUSETTS.

SHOCK ABSORBER.

Application filed October 13, 1924, Serial No. 743,234. Renewed February 2, 1927.

This invention relates to a shock-absorbing attachment for a vehicle, the body of which is mounted on springs supported by the axles of the vehicle, the body including, for example, the chassis of an automobile.

The object of the invention is to provide a simple and efficient shock-absorber adapted to be conveniently installed on the vehicle, and to gradually and smoothly check the upthrow of the body when the distance between the body and the axles is abnormally increased as a result of contact of the vehicle wheels with obstructions or inequalities on the road.

Of the accompanying drawings forming a part of this specification,—

Figure 1 shows in section the front axle of an automobile, and in elevation the forward end portion of one of the side members of the chassis frame, a front spring, and a shock-absorber embodying the invention.

Figure 2 is a view similar to portions of Figure 1, showing the condition of the shock-absorber when the distance between the vehicle body and axles is abnormally increased.

Figure 3 is a view corresponding to Figure 1, but showing the rear end portion of the chassis frame member, the rear axle, and a rear spring.

Figure 4 is a section on line 4—4 of Figure 1.

Figure 5 shows in perspective, a portion of the front axle and a clamp associated therewith, constituting an element of the shock-absorber.

Figure 6 is an edge view of the spring and its arms, shown by Figures 1, 2 and 3.

Figure 7 is an enlargement of a portion of Figure 1, showing the upper end of the strap shown by Figures 1, 2, and 3.

Figure 8 shows in perspective, separated from each other, elements of the clamp shown by Figure 7.

The same reference characters indicate the same parts in all of the figures.

Figures 1 and 3 show, respectively, the forward and rear end portions of one of the side members $a$ of an automobile chassis. $b$ (Figures 1 and 5) designates the front axle, $c$ designates one of the forward springs, $d$ designates one of the rear springs, and $e$ designates the rear axle.

The resilient element of my improved shock absorber and snubber is composed of a resilient metal rod including a coiled portion constituting an open helical spring 13, and end portions constituting straight arms 14 and 15, projecting in the same direction from the end convolutions of the spring. The arm 14 is tangential to one of the end convolutions of the spring, and the arm 15 is tangential to the other end convolution. The arms are relatively arranged to increase the tension of the spring, when one arm is moved toward the other. The arm 14 is at one side, and the arm 15 at the opposite side of the center of the spring, and the arm 15 is free. The arm 14 is fixedly secured by a clamping bracket engaged with the member $a$, and embracing substantially the entire length of the arm. Said bracket is preferably a metal plate, folded on itself as shown by Figure 4, to form a flat sided socket 29, receiving the arm 14, which also has flat sides.

The plate has free edges which are clamped together and to the member $a$ by bolts 30.

The described form of the bracket and arm enables the bracket to so confine the arm that it cannot turn in the bracket. The clamping plate or bracket is seated on a vertical face of the member $a$, and rigidly confines the arm 14 in position to maintain the spring with its convolutions substantially vertical, and the free arm 15, above the confined arm. 17 designates a tether which may be a strap of any suitable material, and is connected at one end with the free arm 15, as by the engagement of a looped portion 18 of the tether with an eye 16 formed on the arm. The tether extends downward from the free arm 15, across the confined arm 14, and is connected at its opposite end with an axle of the vehicle.

The tether associated with the front axle $b$, is preferably connected therewith by means including a clamp, composed of grooved members 19 and 20, engaging the lower portion of said axle, as shown by Figures 1 and 5, and a screw 21, connecting said members, and an ear 22, formed on the member 21, and provided with a slot 23, receiving a looped portion 26 of the tether.

The tether associated with the rear axle $e$ is preferably connected therewith by means including a looped portion 27, embracing the rear axle, as shown by Figure 3.

The arrangement is such that the spring 13 is expanded, and has a minimum tension, and the free arm 15 is at a maximum distance from the confined arm 14, when said body member and axle are normally separated, as shown by Figures 1 and 3. The arrangement is also such that the free arm is moved toward the confined arm, to increase the tension of the spring, by an abnormal movement, caused by an upthrow of the body member *a*, and increasing the distance between the body member and the axle.

The tangential arrangement of the arms relative to the end convolutions of the spring, the location of the free arm 15 above the confined arm 14, and the confinement of the major portion of the arm 14 by the clamping bracket, are important features of my invention. They cause a uniform increase of tension of all of the convolutions of the spring 13, by a movement of the free arm toward the confined arm, so that the spring is sufficiently tensioned throughout all of its convolutions, to cause a gradual increase of its resistance to an upthrow of the body member, and a gradual checking of the upthrow without objectionable shock or jar. The confinement of the major portion of the confined arm 14 prevents flexure of said arm when the free arm is moved toward the confined arm, so that the tension of the spring is increased wholly by a movement of the free arm, the increase of tension commencing with the initial movement of the free arm.

The looped portions 18, 26 and 27 may be maintained by a yoke 31, formed to bestride portions of the tether, a metal plate 32, formed to bear on one side of the loop, and provided with holes 33, receiving the threaded arms of the yoke, and a lip 34 bearing on one side of the strap, and clamping nuts 36 engaging said threaded ends.

The described device constitutes a combined snubber and shock-absorber which is adapted to perform its snubbing function by retarding the upthrow of the body only at the point where the vehicle springs commence to sustain the return movement.

The combined snubber and shock absorber has a double action, because it offers equal resistance to both upward and downward movements of the vehicle body caused by road inequalities, and therefore minimizes shocks and jars and enables the body to ride smoothly.

I claim:

1. A combined snubber and shock-absorber for vehicles, comprising a resilient rod having a coiled central portion, forming a helical spring, and straight end portions, one extending tangentially from one of the end convolutions, and the other extending tangentially from the opposite end convolution, both arms extending in the same direction from the spring, the arms being relatively arranged to increase the tension of the spring when one arm is moved toward the other, a clamping bracket engaged with a spring-supported body portion of the vehicle and embracing the major portion of one of said arms, to confine the same throughout substantially its entire length, the other arm being free, and a tether connected at one end with the free arm, extending therefrom across the confined arm, and connected at its opposite end with an axle of the vehicle, the arrangement being such that when the body member and axle are normally separated, the spring is expanded and has a minimum tension, and the free arm is moved toward the confined arm, to increase the tension of the spring by an abnormal movement increasing the distance between the body member and the axle, the confinement of the major portion of the confined arm preventing flexure thereof, when the free arm is moved toward the confined arm, so that the tension of the spring is increased wholly by a movement of the free arm, the increase of tension commencing with the initial movement of the free arm.

2. A combined snubber and shock-absorber as specified by claim 1, the said clamping bracket being composed of a folded metal plate forming a socket embracing substantially the entire length of the confined arm, and having edges clamped together and to the body member by clamping bolts.

3. A combined snubber and shock-absorber as specified by claim 1, the confined arm being provided with flat sides, the said clamping bracket being composed of a folded metal plate forming a socket also having flat sides, and embracing substantially the entire length of the confined arm, said plate having edges which are clamped together and secured to the body member by clamping bolts.

In testimony whereof I have affixed my signature.

GEORGE M. EDGARTON.